(12) United States Patent
Xu et al.

(10) Patent No.: US 10,701,384 B2
(45) Date of Patent: Jun. 30, 2020

(54) METHOD AND APPARATUS FOR IMPROVEMENT ON DECODER SIDE MOTION DERIVATION AND REFINEMENT

(71) Applicant: Tencent America LLC, Palo Alto, CA (US)

(72) Inventors: Meng Xu, San Jose, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/402,652

(22) Filed: May 3, 2019

(65) Prior Publication Data

US 2020/0045325 A1 Feb. 6, 2020

Related U.S. Application Data

(60) Provisional application No. 62/713,403, filed on Aug. 1, 2018.

(51) Int. Cl.
*H04N 19/42* (2014.01)
*H04N 19/44* (2014.01)
(Continued)

(52) U.S. Cl.
CPC ............ *H04N 19/44* (2014.11); *H04N 19/20* (2014.11); *H04N 19/42* (2014.11); *H04N 19/61* (2014.11); *H04N 19/80* (2014.11)

(58) Field of Classification Search
CPC ................................ H04N 19/42; H04N 19/44
(Continued)

(56) References Cited

U.S. PATENT DOCUMENTS

2005/0053143 A1 3/2005 Holcomb et al.
2011/0170597 A1 7/2011 Shi et al.
(Continued)

OTHER PUBLICATIONS

Seiler et al. "Spatio-temporal prediction in video coding by spatially refined motion compensation." In: 2008 15th IEEE International Conference on Image Processing. Dec. 12, 2008 (Dec. 12, 2008) Retrieved on Sep. 9, 2019 (Sep. 9, 2019) from <http://citeseerx.ist.psu.edu/viewdoc/download?doi=10.1.1.142.1234&rep=rep1&type=pdf> entire document.

(Continued)

*Primary Examiner* — Jeffery A Williams
(74) *Attorney, Agent, or Firm* — Oblon, McClelland, Maier & Neustadt, L.L.P.

(57) ABSTRACT

A method of video decoding for a video decoder includes receiving a coded video bitstream and obtaining, for a current block from the coded video bitstream, one or more initial motion vectors. The method further includes determining whether a decoder side motion vector refinement process is enabled. In response to determining that the decoder side motion vector refinement process is enabled, the method further includes determining whether the one or more initial motion vectors are included in a latency region that indicates a region of one or more blocks having unrefined motion vectors. In response to determining that the one or more initial motion vectors are not included in the latency region, the method further includes performing the motion vector refinement process using the one or more initial motion vectors to generate a plurality of refined motion vectors.

20 Claims, 14 Drawing Sheets

(51) Int. Cl.
*H04N 19/20* (2014.01)
*H04N 19/80* (2014.01)
*H04N 19/61* (2014.01)

(58) Field of Classification Search
USPC .................................................. 375/240.25
See application file for complete search history.

(56) References Cited

U.S. PATENT DOCUMENTS

| | | | |
|---|---|---|---|
| 2013/0128974 A1* | 5/2013 | Chien | H04N 19/139 375/240.15 |
| 2014/0079130 A1 | 3/2014 | Sugio et al. | |
| 2016/0286229 A1 | 9/2016 | Li et al. | |
| 2018/0192071 A1 | 7/2018 | Chuang et al. | |

OTHER PUBLICATIONS

International Search Report and Written Opinion dated Oct. 9, 2019 in PCT/US2019/041860, citing documents AA-AE and AW therein.
High Efficiency Video Coding , Rec. ITU-T H.265v4, Dec. 2016 (664 pages).
B. Bross, J. Chen, S. Liu, "Versatile Video Coding (Draft 2)", ISO/IEC JTC1/SC29/WG11 JVET-K1001, Jul. 2018 (140 pages).
S. Esenlik, Y.-W. Chen, F. Chen, "Description of Core Experiment 9 (CE9): Decoder Side Motion Vector Derivation", ISO/IEC JTC1/SC29/WG11 JVET-K1029, Jul. 2018 (11 pages).

* cited by examiner

METHOD AND APPARATUS FOR IMPROVEMENT ON DECODER SIDE MOTION DERIVATION AND REFINEMENT

INCORPORATION BY REFERENCE

This present disclosure claims the benefit of priority to U.S. Provisional Application No. 62/713,403, "IMPROVEMENT ON DECODER SIDE MOTION DERIVATION AND REFINEMENT" filed on Aug. 1, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Decoder side motion vector refinement (DMVR) is a subset of decoder side motion vector derivation (DMVD). DMVR is a tool to improve/refine a motion vector based on starting points. However, DMVR may not be available for all motion vectors when decoding a current block. Furthermore, constraining the DMVR process may require additional buffer capacity for storing MVs. Thus, there is a need to improve the DMVR process.

SUMMARY

An exemplary embodiment of the present disclosure includes a method of video decoding for a video decoder. The method includes receiving a coded video bitstream and obtaining, for a current block from the coded video bitstream, one or more initial motion vectors. The method further includes determining whether a decoder side motion vector refinement process is enabled. In response to determining that the decoder side motion vector refinement process is enabled, the method further includes determining whether the one or more initial motion vectors are included in a latency region that indicates a region of one or more blocks having unrefined motion vectors. In response to determining that the one or more initial motion vectors are not included in the latency region, the method further includes performing the motion vector refinement process using the one or more initial motion vectors to generate a plurality of refined motion vectors.

An exemplary embodiment of the present disclosure includes a video decoder for video decoding. The video decoder includes processing circuitry configured to receive a coded video bitstream and obtain, for a current block from the coded video bitstream, one or more initial motion vectors. The processing circuitry is further configured to determine whether a decoder side motion vector refinement process is enabled. In response to the determination that the decoder side motion vector refinement process is enabled, the processing circuitry is further configured to determine whether the one or more initial motion vectors are included in a latency region that indicates a region of one or more blocks having unrefined motion vectors. In response to the determination that the one or more initial motion vectors are not included in the latency region, the processing circuitry is further configured to perform the motion vector refinement process using the one or more initial motion vectors to generate a plurality of refined motion vectors.

An exemplary embodiment of the present disclosure includes non-transitory computer readable medium having instructions stored therein, which when executed by a processor in a video decoder causes the processor to execute a method that includes receiving a coded video bitstream and obtaining, for a current block from the coded video bitstream, one or more initial motion vectors. The method further includes determining whether a decoder side motion vector refinement process is enabled. In response to determining that the decoder side motion vector refinement process is enabled, the method further includes determining whether the one or more initial motion vectors are included in a latency region that indicates a region of one or more blocks having unrefined motion vectors. In response to determining that the one or more initial motion vectors are not included in the latency region, the method further includes performing the motion vector refinement process using the one or more initial motion vectors to generate a plurality of refined motion vectors.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
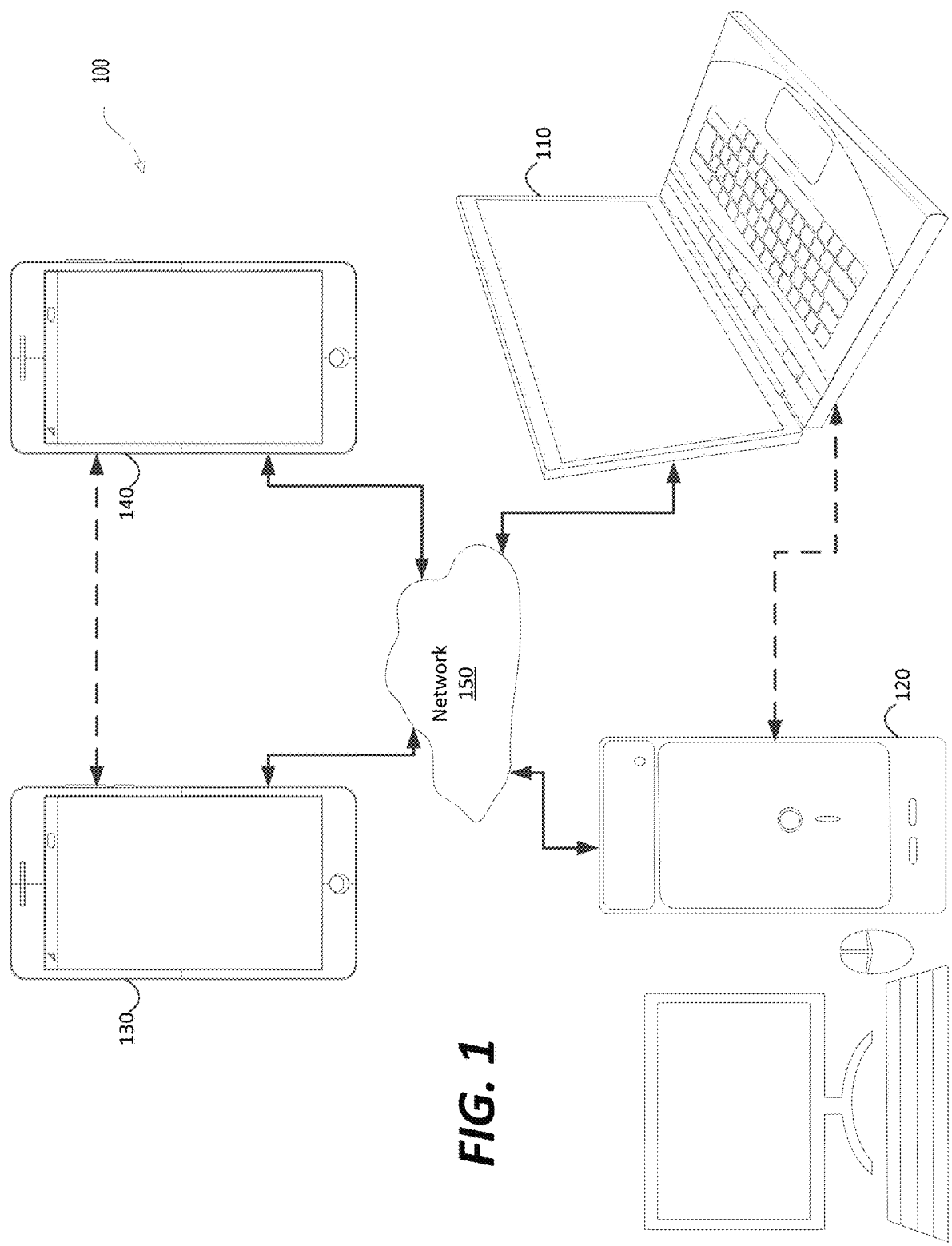
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
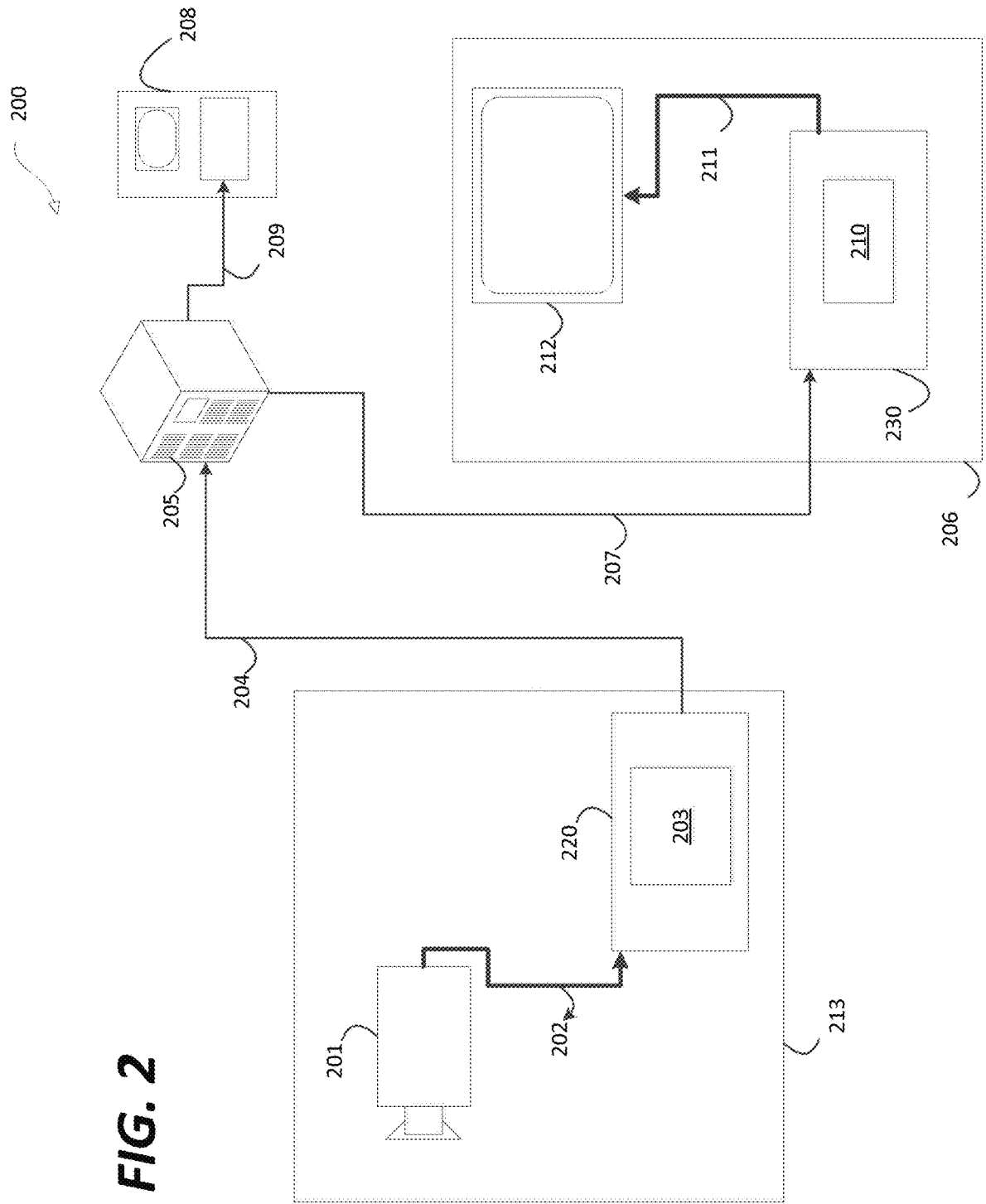
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
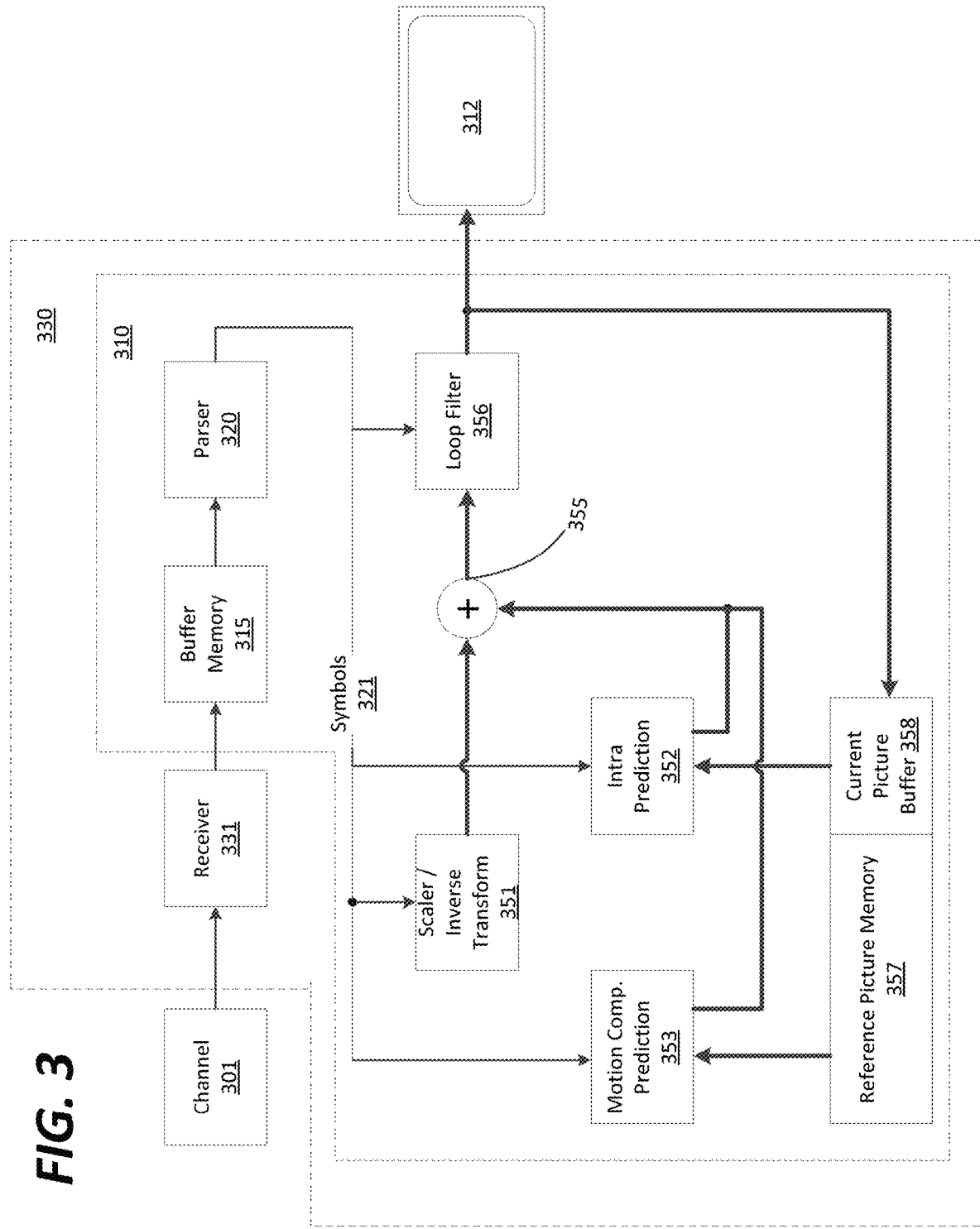
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
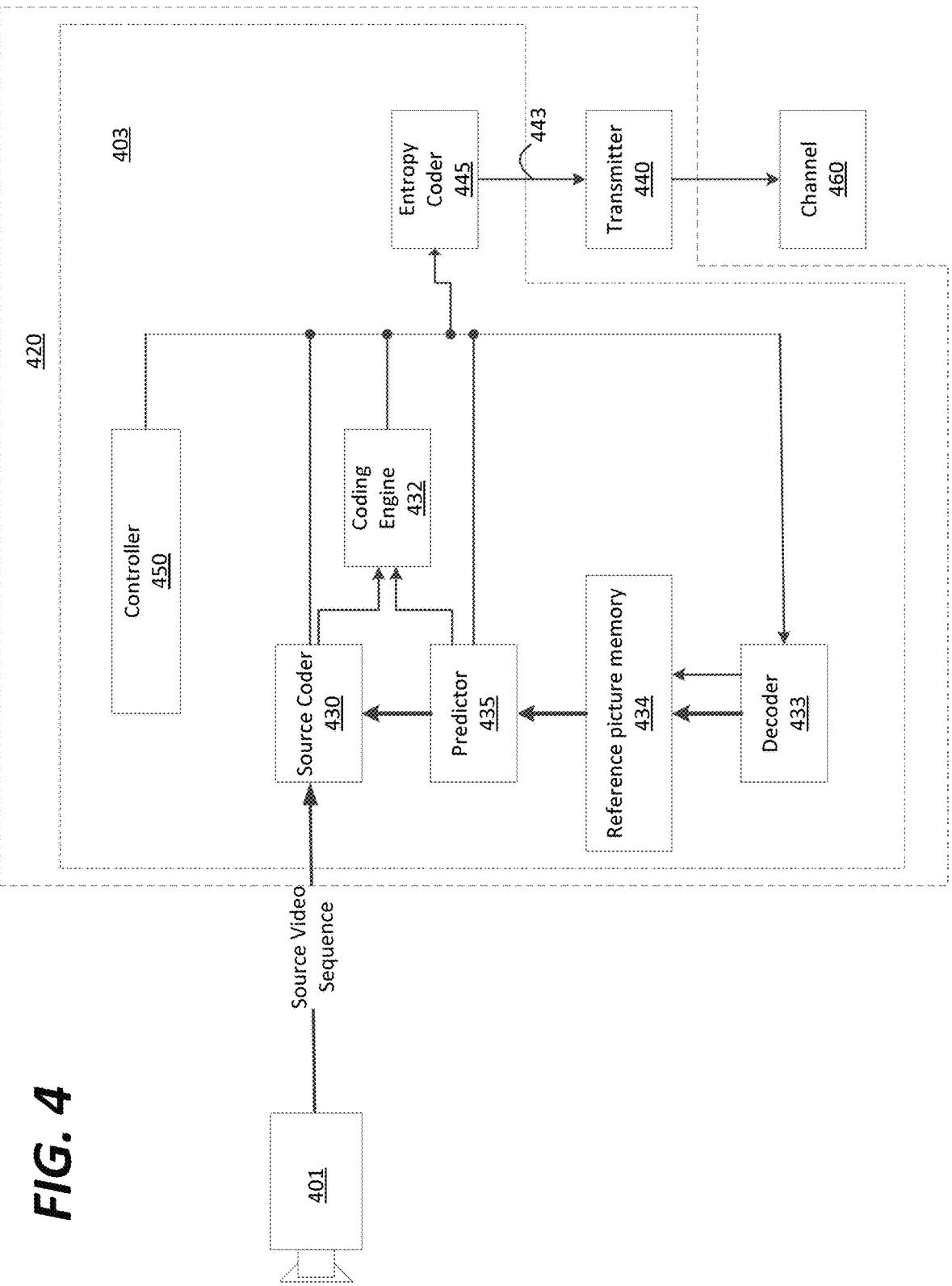
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into CTUs for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
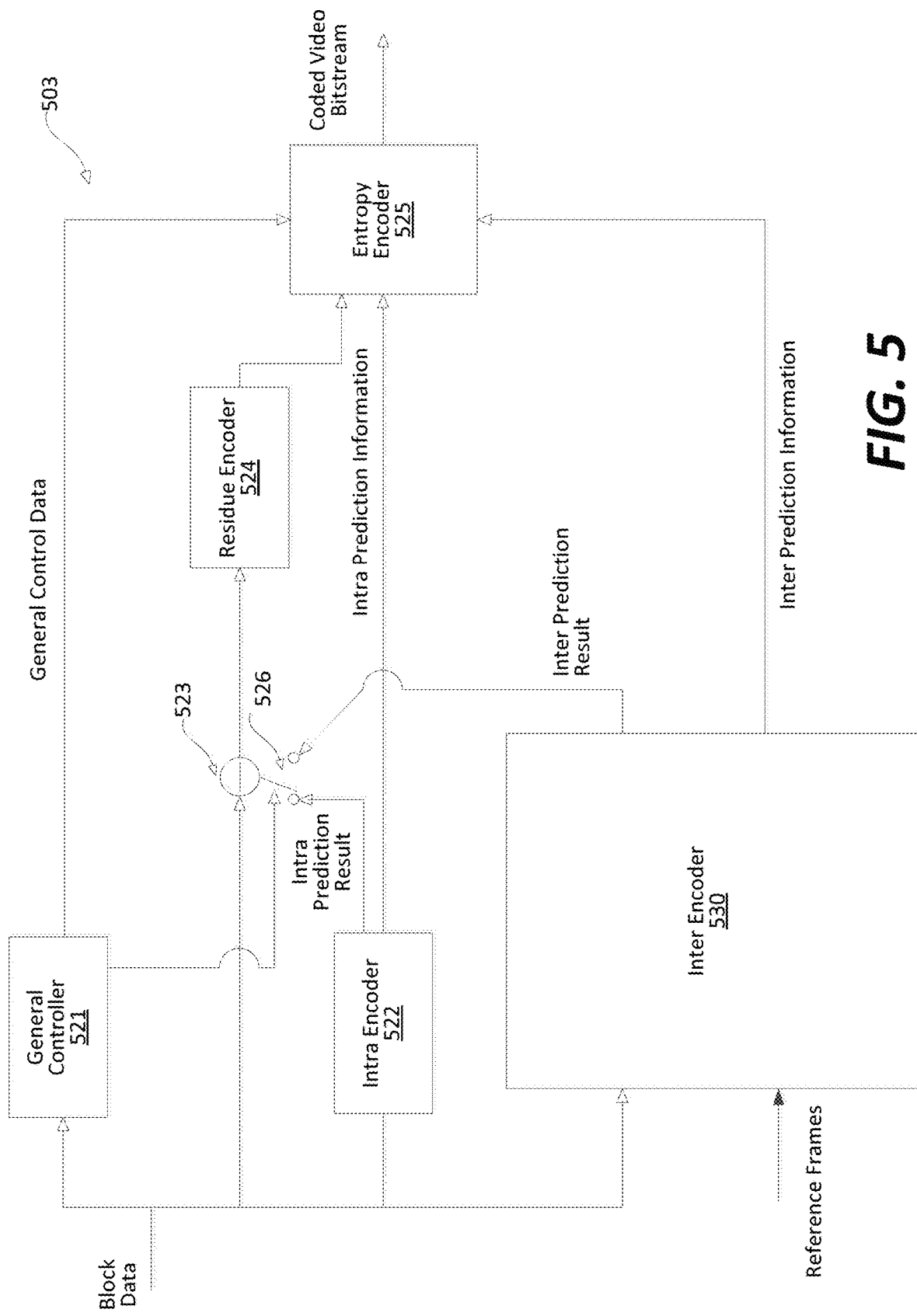
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
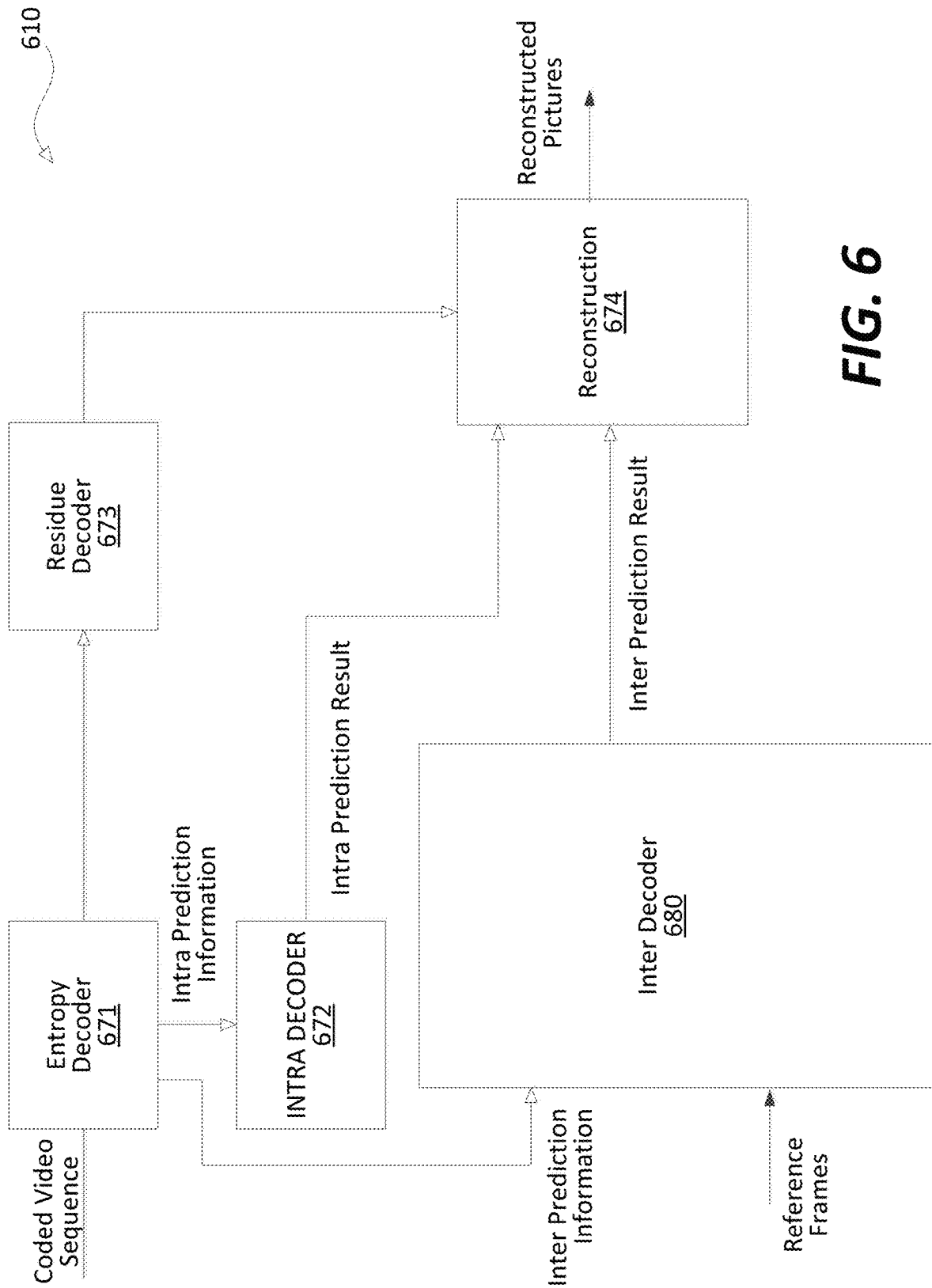
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Figure 7:
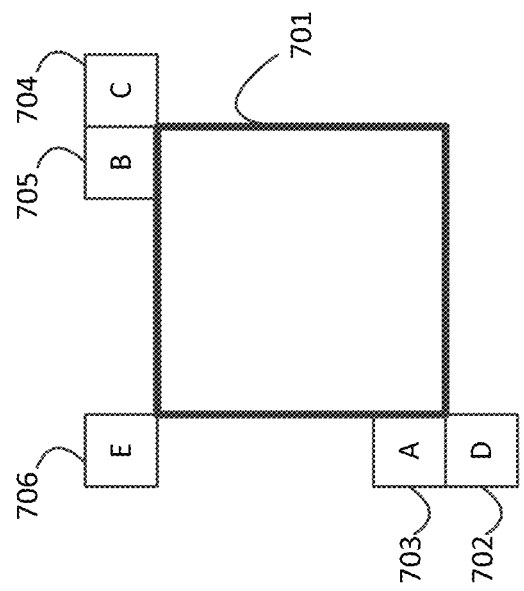
FIG. 7 is a schematic illustration of a current block and its surrounding spatial merge candidates in one example.

Merge candidates may be formed by checking motion information from either spatial or temporal neighbouring blocks of the current block. Referring to FIG. 7, a current block (701) comprises samples that have been found by the encoder/decoder during the motion search process to be predictable from a previous block of the same size that has been spatially shifted. In some embodiments, instead of coding that motion vector directly, the motion vector can be derived from metadata associated with one or more reference pictures, for example, from a most recent (in decoding order) reference picture, using the motion vector associated with either one of five surrounding samples, denoted D, A, C, B, and E (702 through 706, respectively). The blocks A, B, C, D, and E may be referred to as spatial merge candidates. These candidates may be sequentially checked into a merge candidate list. A pruning operation may be performed to make sure duplicated candidates are removed from the list.

DMVR improves/refines a MV based on starting points. The starting point of DMVR may be the initial (e.g., non-refined) MV (e.g., MV0 MV1). For example, in FIG. 8, the dots pointed by MV0 & MV1 are the starting points. According to some embodiments, in bi-prediction operation, for the prediction of one block region, two prediction blocks, formed using a MV of list0 and a MV of list1, respectively, are combined to form a single prediction signal. In the DMVR method, the two motion vectors of the bi-prediction may be further refined by a bilateral matching process. The bilateral matching process may be applied in the decoder to perform a distortion-based search between reconstruction samples in the reference pictures to obtain a refined MV without transmission of additional motion information.

According to some embodiments, DMVR may be applied in the merge and skip modes, if the following condition is true:

$$(POC-POC0)*(POC-POC1)<0, \quad Eq. 1$$

where POC is the picture order count of a current picture to be encoded/decoded, and POC0 and POC1 are the picture order counts of the references for the current picture.

In some embodiments, a signaled merge candidate pair may be used as input to the DMVR process and are denoted initial motion vectors (MV0, MV1). In some embodiments, a merge index is signaled to indicate which merge candidate is used. The merge candidates may come from spatial neighbors as shown in FIG. 7, or from other candidates. Then, the MV predictor from the selected merge candidate is used as the DMVR initial MV. The search points that are searched by the DMVR process obey a MV difference mirroring condition. For example, any point that is checked by DMVR, denoted by candidate motion vector pair (MV0', MV1') obeys the following two equations:

$$MV0'=MV0+MV_{diff}, \quad Eq. 2$$

$$MV1'=MV1+MV_{diff}, \quad Eq. 3$$

where $MV_{diff}$ represents points in a search space in one of the reference pictures.

Figure 8:
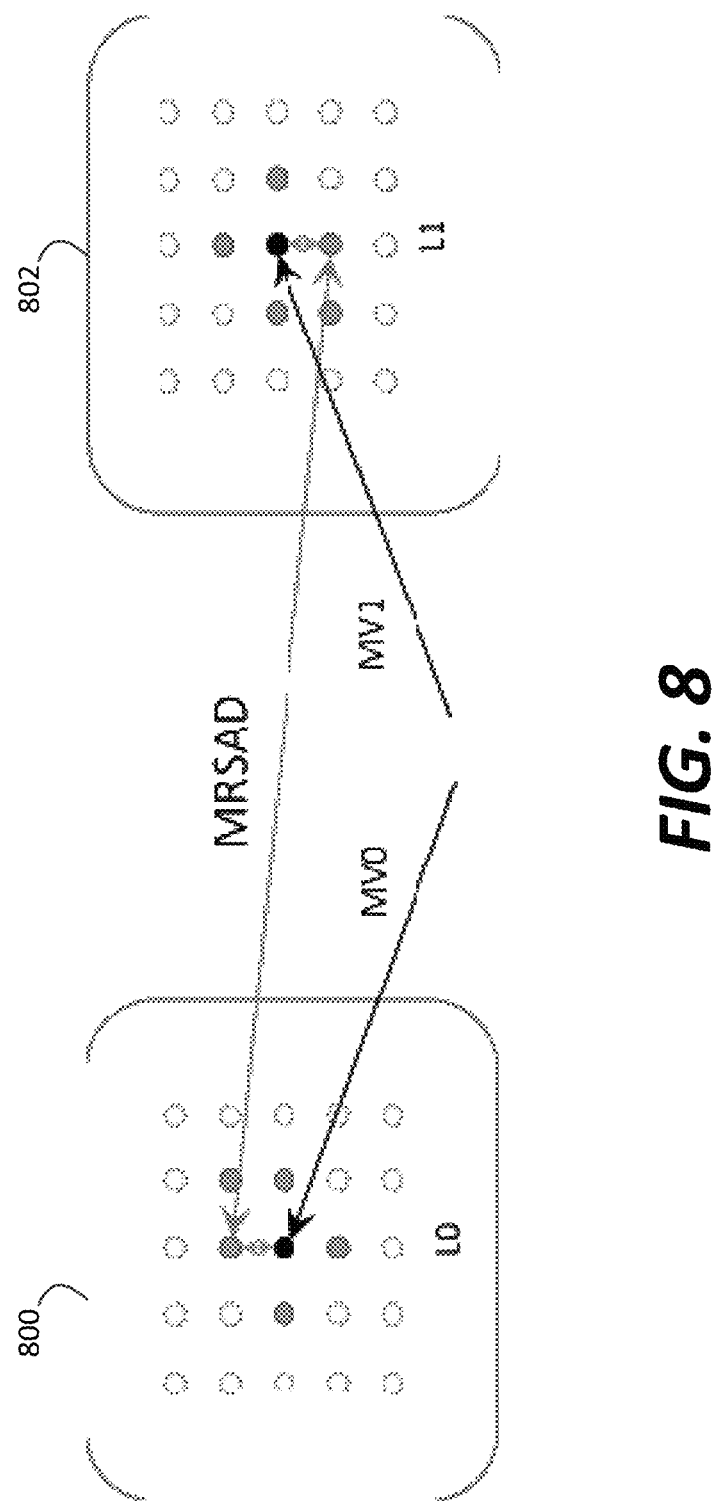
FIG. 8 illustrates an embodiment of bilateral searching with a six point search.

In some embodiments, after the construction of the search space, unilateral predictions may be constructed using a regular 8-tap DCTIF interpolation filter. The bilateral matching cost function may then be calculated by using a mean-removed sum of absolute differences (MRSAD) between two prediction points, and the search point resulting in the minimum cost is selected as the refined MV pair. FIG. 8 illustrates an example search space using 16 bit precision of samples, which is the output of the interpolation filtering, where no clipping and no rounding operations are applied before the MRSAD calculation to reduce internal buffer requirements.

Figure 9B:
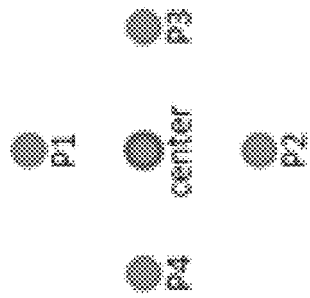
FIG. 9B illustrates an example of a half sample search pattern.
Figure 9A:
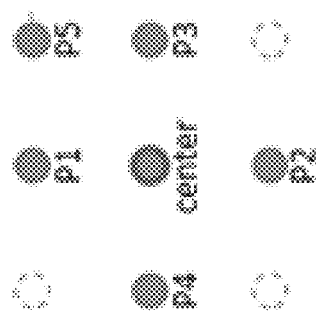
FIG. 9A illustrates an example of an adaptive integer search pattern.

As illustrated in FIG. 8, reference pictures 800 and 802 includes 16 samples. MV0 points to reference picture 800, and MV1 point to reference picture 802. The integer precision search points may be chosen by an adaptive pattern method. The cost corresponding to the central points, pointed by the initial motion vectors (MV0, MV1), is first calculated. The other four costs (in sign (+) shape) may be calculated by the two predictions, located at the opposite sides of each other by the central point. For example, in FIG. 8, after the cost between MV0 & MV1 (indicated by the black dots) is calculated, four additional costs are calculated (the offsets to the center are symmetric): 1. between the point above MV0 and the point below MV1 (as indicated by the MRSAD arrow); 2. between the point below MV0 and the point above MV1; 3. between the point on the left of MV0 and the point on the right of MV1; 4. between the point on the right of MV0 and the point on the left of MV1. These five calculations can be performed in any particular order. The last 6th point at the angle may be chosen by the gradient of the previous calculated costs. FIG. 9A illustrates an adaptive integer search pattern, and FIG. 9B illustrates a half sample search pattern. In FIG. 9A, the points are checked using a sum of absolute difference (SAD) calculation. For example, P5 is checked if the following condition is met:

$$SAD(P1)<SAD(P2)\&\& SAD(P3)<SAD(P4). \quad Eq. 4$$

FIG. 9A shows the integer points involved in the calculation of a current iteration. Each iteration may contain 3 steps. In step 1, 5 costs are calculated (center, P1 to P4). In step 2, to reduce the number of calculations, the cost for the 4 corner points are not calculated. Instead, only one corner point (e.g., P5) is calculated. P5 has 4 possible locations/offsets, and the location/offset of P5 is determined based on the costs of P1,P2,P3,P4. In an example, if Eq.4 is satisfied, then the location/offset of P5 is determined as next to P1 and P3, (i.e., the top right of the center). In step 3, the computed 6 costs are compared to find the point that corresponds to the smallest cost. If it is not at the center, then this point is set as the center point at the next iteration. Otherwise, the iteration stops. If a maximum number of iterations is reached, the iteration also stops. After the integer search iterations, the integer point with minimal cost is obtained. Then, this obtained point is selected as the center for a half-pixel refinement, as shown in FIG. 9B, where P1, P2, P3, and P4 are located halfway between center and its adjacent top, bottom, left, right neighbors. Thus, P1, P2, P3, and P4 have half-pixel precision. The costs of P1, P2, P3, and P4 are computed, then these 5 costs are compared to determine the final refined point/offset.

According to some embodiments, the output of the DMVR process may be the refined motion vector pair (MV0', MV1') corresponding to the minimal cost. If after one iteration the minimum cost is achieved at the central point of the search space (i.e., the motion vectors are not changed), the refinement process may be terminated. Otherwise, DMVR process continues, while the minimal cost does not correspond to the central point, and the search range is not exceeded. In some embodiments, half sample precision search may be applied only if application of a half-pel search does not exceed the search range. In this situation, only 4 MRSAD calculations may be performed, corresponding to plus shape points around the central point, which may be chosen as the best (i.e., minimal cost) during the integer precision search. At the end of the search, the refined motion vector pair corresponding to the minimal cost point is output.

Figures 10A, 10B:
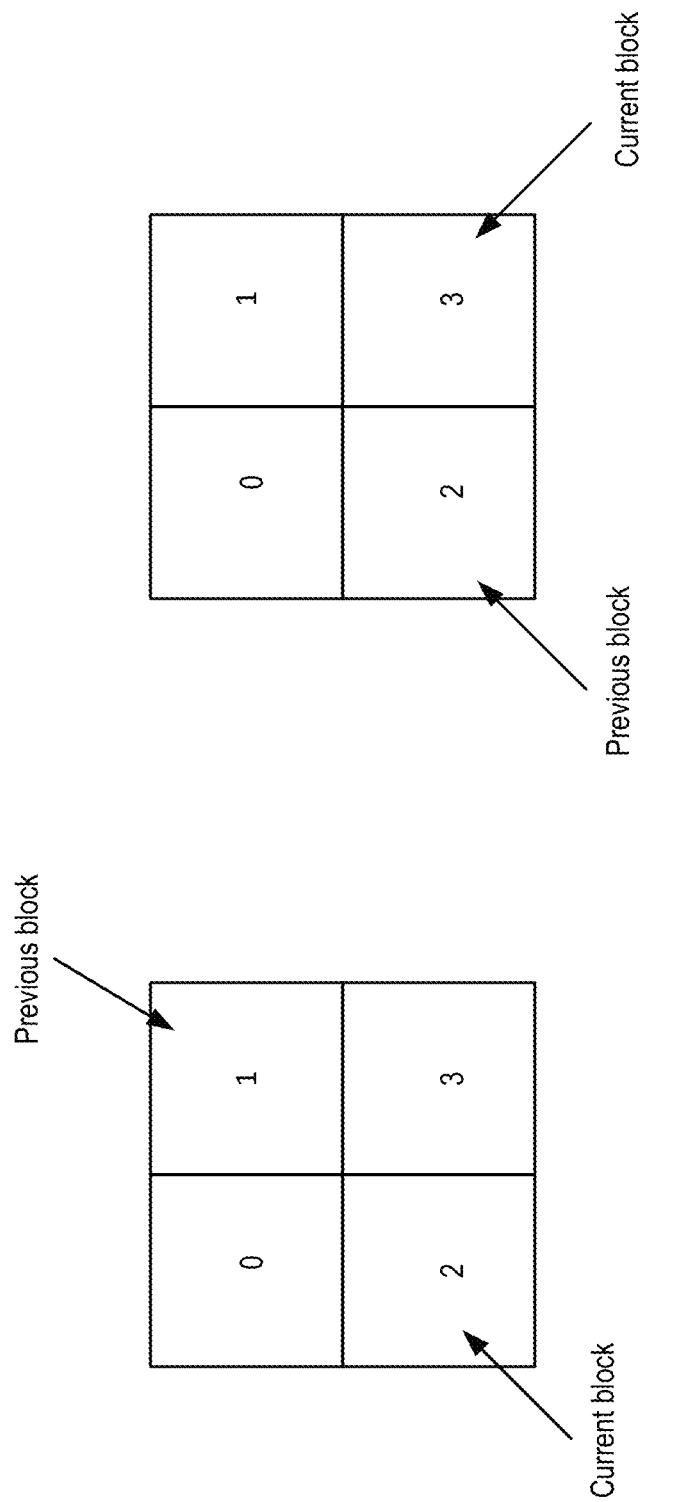
FIGS. 10A and 10B illustrate a spatial relationship between a current block and its previous block.

FIGS. 10A and 10B illustrate two examples of a spatial relationship between a current coding block and the previous block immediately coded before the current block. According to some embodiments, a block may refer to a prediction block, a coding block, or a coding unit (CU). The decoding order may be from blocks 0 to 3. This decoding order may be known by both the encoder and the decoder. When decoding the current block, the MVs of the current block's spatial neighbors may be used as predictors for coding the MV of the current block. For example, MVs from blocks 0 and 1 may be used as predictor candidates for block 2 in FIG. 2, and MVs from block 0, 1, 2 may be used as predictor candidates for block 3 in FIG. 10B. In FIG. 10A, block 3 is not a predictor candidate for block 2 since block 3 is decoded after block 2.

According to some embodiments, constraints may be imposed over a DMVD process such as DMVR. For example, constraints over DMVR may be imposed to solve a pipeline latency issue due to a dependency between the refined MVs in the previously coded blocks and the initial MV of the current block. A latency region may be a region in which motion information before the MV refinement process is performed is also stored in addition to a regular motion field. There are some problems that arise when imposing a constraint over a DMVD process such as DMVR. For example, when a constraint is imposed over a DMVD process, additional buffer capacity for MV storage may be necessary. Furthermore, when a refined MV is equal to the unrefined MV, these two MVs use different interpolating filters, depending on whether DMVD is performed, which is not desired. Additionally, the unrefined MV used in a deblocking boundary strength decision may not be accurate.

Embodiments of the present invention are directed to solving these problems by modifying the decoding process of a video codec such that when some DMVD methods, or methods that require further modification of the MV after initial parsing stage, are enabled, some MV predictors or reconstructed samples from spatial neighbors of the current block are not available for use and may be substituted when predicting the MV of a current block.

As discussed above, a latency region may be a region in which motion information before MV refinement is also stored in addition to regular motion field (the buffer for MV after refinement). The latency region may be rectangular or non-rectangular. The latency region may be composed of multiple sub regions, where each sub region may be rectangular or non-rectangular. If a MV predictor is derived from a block located in the latency region, then that MV is unavailable for DMVR. For example, referring to FIG. 8, if MV0 is determined as an MV predictor from a block in the latency region, then the DMVR process is not performed since MV0 is unavailable, or another MV is selected or obtained, and the DMVR process is performed with MV1 and the newly selected/obtained MV.

In some embodiments, the shape and size of a latency region and corresponding sub regions may be signaled in bitstream such as in a Sequence Parameter Set (SPS), a picture parameter set (PPS), or a slice header. In some embodiments, the shape and size of a latency region may be fixed, such as 128×128 or 64×64, but the number of sub regions contained in a latency region may be signaled in bitstream such as in the SPS, PPS, or slice header. In some embodiments, the size of a sub latency region may be associated with a CTU size, such as full CTU or quarter CTU (e.g., half CTU width and half CTU height).

Figure 11:
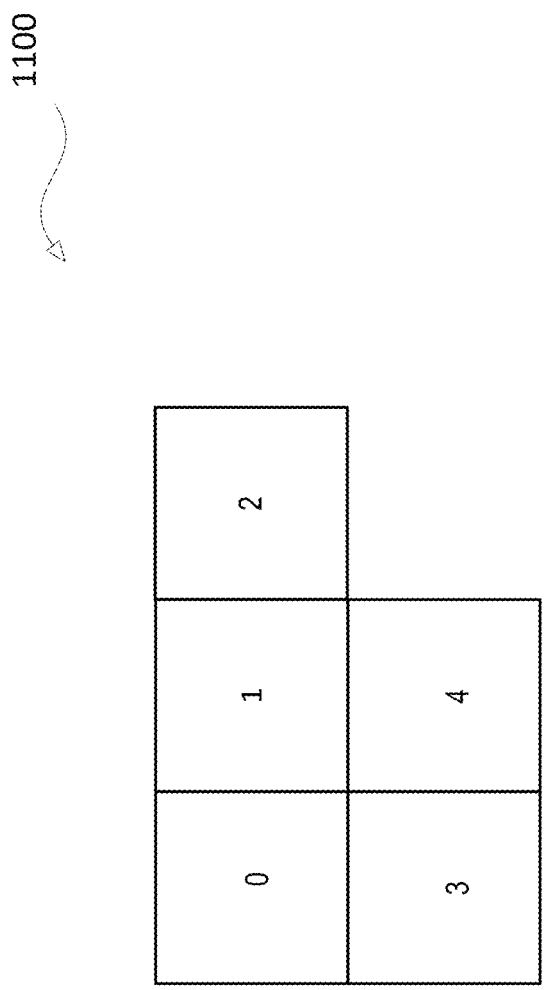
FIG. 11 illustrates an example coding tree unit (CTU) with neighboring latency regions.

According to some embodiments, for a given number of sub regions in the latency region, the locations of each sub region may be predetermined. FIG. 11 illustrates an example CTU 1100 with blocks 0-4. In one example, block 4 is the current block to be decoded. Block 0 is the top-left neighbor of block 4. Block 1 is the top neighbor of block 4. Block 2 is the top-right neighbor of block 4. Block 3 is the left neighbor of block 4. The latency region may contain both block 3 and 4, or contain block 2, 3, 4, or contain block 1, 2, 3, 4, or contain all the five blocks. As an example, if block 4 has a size of 128×128, block 4 contains two 128×64 sub-blocks. The second 128×64 block is not allowed to perform DMVR if the MV of this second block is from the first 128×64 block, because the first block is inside block 4, and thus, the first block is inside the latency region. Accordingly, the latency region may include sub regions that do not share a block boundary (i.e., non-contiguous blocks). Each sub region can contain one or more blocks.

According to some embodiments, in a $2^M \times 2^N$ current block, where M and N may be pre-determined values (e.g., M=3 and N=3), the MVs may be stored in 4×4 granularity (i.e., there are $2^{(M-2)} \times 2^{(N-2)}$ MVs stored for this block). In a DMVD process such as the DMVR process, both refined and unrefined MVs may be stored. In some embodiments, the refined MV may be compressed (i.e., a single refined MV for this $2^M \times 2^N$ current block is stored during the DMVR process). M and N may be the same value or different values. In some embodiments, M and N are signaled in a bitstream, such as in the SPS, PPS, or slice header.

According to some embodiments, the MV of a top-left 4×4 block in a $2^M \times 2^N$ current block is used as the MV for the whole $2^M \times 2^N$ block. In another embodiment, the MV of the center 4×4 block in a $2^M \times 2^N$ block is used as the MV for the whole $2^M \times 2^N$ block. The center 4×4 block may be one of (i) the bottom right 4×4 block of the top-left $2^{M-1} \times 2^{N-1}$ sub-block, (ii) the bottom-left 4×4 block of the top-right $2^{M-1} \times 2^{N-1}$ sub-block, (iii) the bottom-left $2^{M-1} \times 2^{N-1}$ sub-block, and (iv) the top-left 4×4 block of the bottom right $2^{M-1} \times 2^{N-1}$ sub-block.

According to some embodiments, a weighted average of the MVs of the $2^M \times 2^N$ current block is used as the MV for the whole $2^M \times 2^N$ block. The weight may be the same for all MVs. Alternatively, the MV which occurs most frequently in this $2^M \times 2^N$ current block is assigned with a weight of 1, and other MVs are assigned with weight of 0.

When a $2^M \times 2^N$ current block contains an intra block, the MV of the intra block is determined using one of the following described embodiments. In some embodiments, the MV of the intra block is considered unavailable. In some embodiments, the MV of the intra block is regarded as all zero, and the reference index is assigned with a predefined number. For example, the reference index is assigned as 0. In another example, the reference index is assigned as 1 if more than one reference picture are in the reference list of the block where the MV of this intra block is used as a predictor. With MV compression, for example, the MV predictor of a $2^M \times 2^N$ block is represented by a 4×4 block inside that $2^M \times 2^N$ block. If that 4×4 block happens to be an intra block (with no associated MV), the MV of this 4×4 block is set to zero in both the horizontal and vertical components (i.e., MVx=0 and MVy=0)).

In some embodiments, the MV of the intra block is from one of the intra block's spatial neighboring blocks. For example, the MV of the intra block is determined as the first available MV using the search pattern described with respect to FIGS. 8, 9A, and 9B. If no MV is available from the search, the MV of the block may be marked as unavailable.

In another example, the MV is set to a zero MV with a reference index of 0 if no MV is available from the search. The zero MV may be bi-predicted, or uni-predicted in B slices.

In some embodiments, the MV of the intra block is from a pre-defined location in the collocated block of the intra block. The pre-defined location may be the top-left 4×4 block, or the center 4×4 block as discussed above.

In some embodiments, the MV of the intra block is determined on a CU basis (i.e., the entire CU shares the same MV). In some embodiments, the MV of the intra block is determined by the 4×4 sub-blocks in a raster scan order, where each 4×4 sub-block may have its own MV.

When the refined MV is compressed, the intra blocks inside the $2^M \times 2^N$ block may be assigned with an MV that can be used as spatial or temporal MV predictors. In some embodiments, the intra blocks inside the $2^M \times 2^N$ block are not assigned any MV, and other blocks may not use any MV from this $2^M \times 2^N$ block. In some embodiments, the intra blocks inside the $2^M \times 2^N$ block may be assigned with the compressed MV. This compressed MV may be regarded as unavailable in the deblocking process. Other blocks may use the compressed MV of this intra block.

According to some embodiments, when a DMVD refined MV is equal to the unrefined MV of a block, the interpolation filter used for motion compensation in the non-DMVD mode may be used for the motion compensation of the current block. In this regard, the unrefined MV may refer to one of the motion vectors MV0 and MV1 (FIG. 8). For example, if MV0 is changed but MV1 is not changed (this is not possible in DMVR but may happen in other DMVD processes), then the following only applies to MV1. When motion compensation in the non-DMVD mode uses an N-tap filter, then this N-tap filter may also be applied during the DMVD process for the final motion compensation of the current block if the refined MV is equal to the unrefined MV.

In some embodiments, N is a fixed number such as 6, 8, or 10. In some embodiments, N is dependent on a position of a sample. In some embodiments, N is dependent on the luma/chroma channel. For example, for a luma channel, N may be 8, and for a chroma channel, N may be 4.

Figure 12:
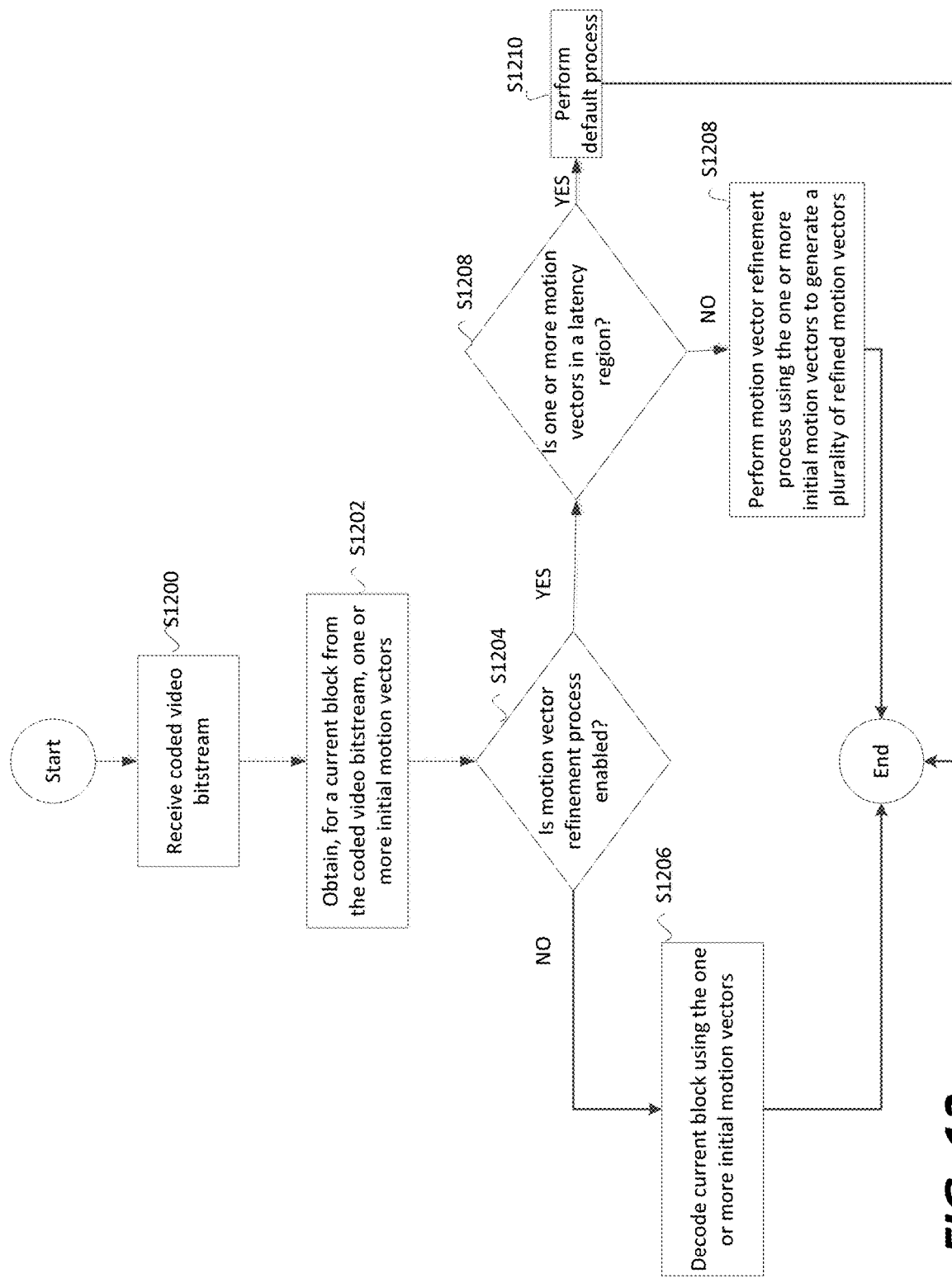
FIG. 12 illustrates an embodiment of a process performed by a decoder.

FIG. 12 illustrates an embodiment of a process performed by a decoder such as decoder 610. The process generally starts at step S1200 where a coded video bit stream is received. The process proceeds to step S1202 where, for a current block from the coded video bit stream, one or more initial motion vectors are obtained. These initial motion vectors may be signaled in the bitstream such as the motion vector pair MV0 and MV1 discussed above with respect to FIG. 8.

The process proceeds to step S1204 where it is determined whether a motion vector refinement process is enabled. As an example, the motion vector refinement process may be the DMVR process. If the motion vector refinement process is not enabled, the process proceeds to step S1206 where the current block is decoded using the one or more obtained motion vectors.

If the motion vector refinement process is not enabled, the process proceeds from step S1204 to step S1208, where it is determined if the one or more initial motion vectors are in a latency region. As discussed above, a latency region may be a region in which motion information before MV refinement is also stored in addition to a regular motion field. If the one or more initial motion vectors are not in a latency region, the process proceeds to step S1208 where a motion vector refinement process is performed using the one or more initial motion vectors to generate a plurality of refined motion vectors, as discussed above with respect to FIGS. 8, 9A, and 9B. Returning to step S1208, if the selected candidate motion vector is in a latency region, the process proceeds to step S1210 where a default process is performed such as, treating the one or more initial motion vectors as unavailable, or obtaining new initial motion vectors.

According to some embodiments, a deblocking filter process is performed for each CU in the same order as the decoding process. The deblocking filter process may include filtering vertical edges (horizontal filtering), and then filtering horizontal edges (vertical filtering). Filtering may be applied to 8×8 block boundaries which are determined to be filtered, both for luma and chroma components. 4×4 block boundaries may not be processed in order to reduce the complexity.

In some embodiments, a boundary strength (BS) reflects how strong a filtering process may be needed for the boundary. A value of 2 for the BS indicates strong filtering, a value of 1 for the BS indicates weak filtering, and a value of 0 indicates no deblocking filtering. P and Q may be regarded as blocks which are involved in the filtering, where P may represent the block located to the left (vertical edge case) or above (horizontal edge case) the boundary, and Q may represent the block located to the right (vertical edge case) or above (horizontal edge case) the boundary.

Figure 13:
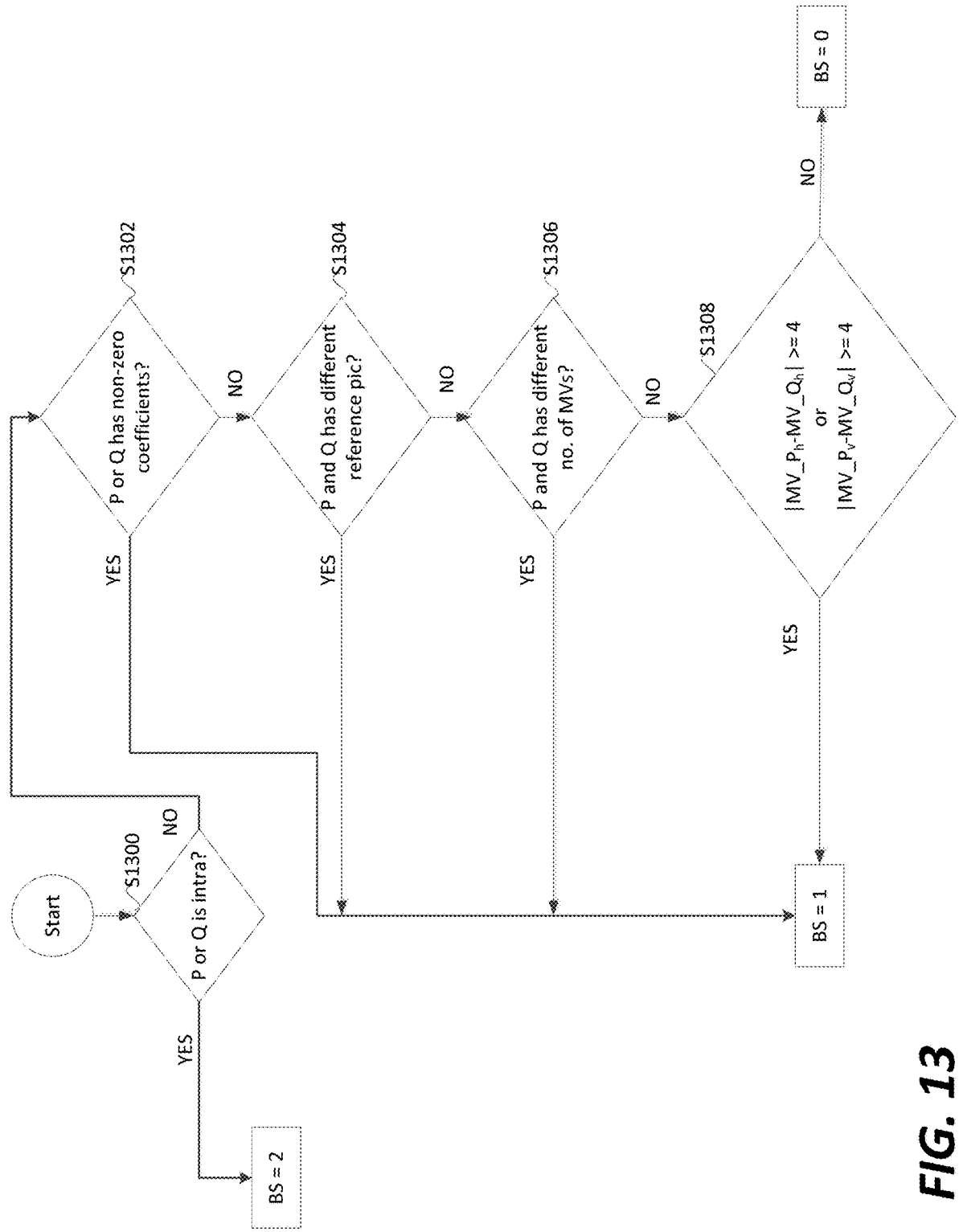
FIG. 13 illustrates another embodiment of a process performed by the decoder.

FIG. 13 illustrates an embodiment of a process for calculating a BS value. The process may be performed by a decoder such as the decoder 610. The process may generally start at step S1300 to determine whether a P block or Q block is encoded in an intra mode. If either the P block or Q block is encoded in the intra mode, the BS value is set to 2.

If neither the P block nor the Q block is encoded in the intra mode, the process proceeds to step S1302 to determine whether the P block or the Q block has non-zero coefficients. If either the P or Q block has non-zero coefficients, the BS value is set to 1.

If neither the P block nor the Q block has non-zero coefficients, the process proceeds to step S1304 to determine whether the P block and the Q block have a different reference picture. If the P block and Q block have different reference pictures, the BS value is set to 1.

If either the P block and the Q block have the same reference pictures, the process proceeds to step S1306 to determine if the P block and the Q block have a different number of motion vectors. If the P block and the Q block have a different number of motion vectors, the BS value is set to 1.

If the P block and the Q block have the same number of motion vectors, the process proceeds to step S1308 where one or more conditions determines whether the BS value is set to 1 or 0. For example, when the MV difference is below a threshold T, the BS is equal to 0. The threshold T may be set to 1 pixel. The MV precision may be ¼ pixel, and the MV difference threshold is set to 4. In another example, the MV precision is 1/16, and the MV difference is set to 16. In step 1308, $MV\_P_h$ is a motion vector of the P block that is above the current block, $MV\_Q_h$ is a motion vector of the Q block that is above the current block, $MV\_P_v$ is a motion vector of the P block that is to the left of the current block, and $MV\_Q_v$ is a motion vector of the Q block that is to the right of the current block.

According to some embodiments, when the DMVD process, such as the DMVR mode, is enabled, the BS value may be determined using the uncompressed refined MV or the compressed refined MV. In some embodiments, when DMVR is applied on any of two blocks to be filtered, the equations in step S1308 may be replaced by the following two equations:

$$|MV\_P_h - MV\_Q_h| >= A*SR+B, \text{ or} \quad \text{Eq. 5}$$

$$|MV\_P_v - MV\_Q_v| >= A*SR+B, \quad \text{Eq. 6}$$

where, A and B are integers, and SR is a search range for the motion vector refinement process. For example, when 1/16 pixel MV precision is used, A is equal to 0, and B is equal to 15. In another example, A is equal to −1 and B is equal to 16. In some embodiments, the BS value is set to 1 when a current block is coded in the DMVR mode.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
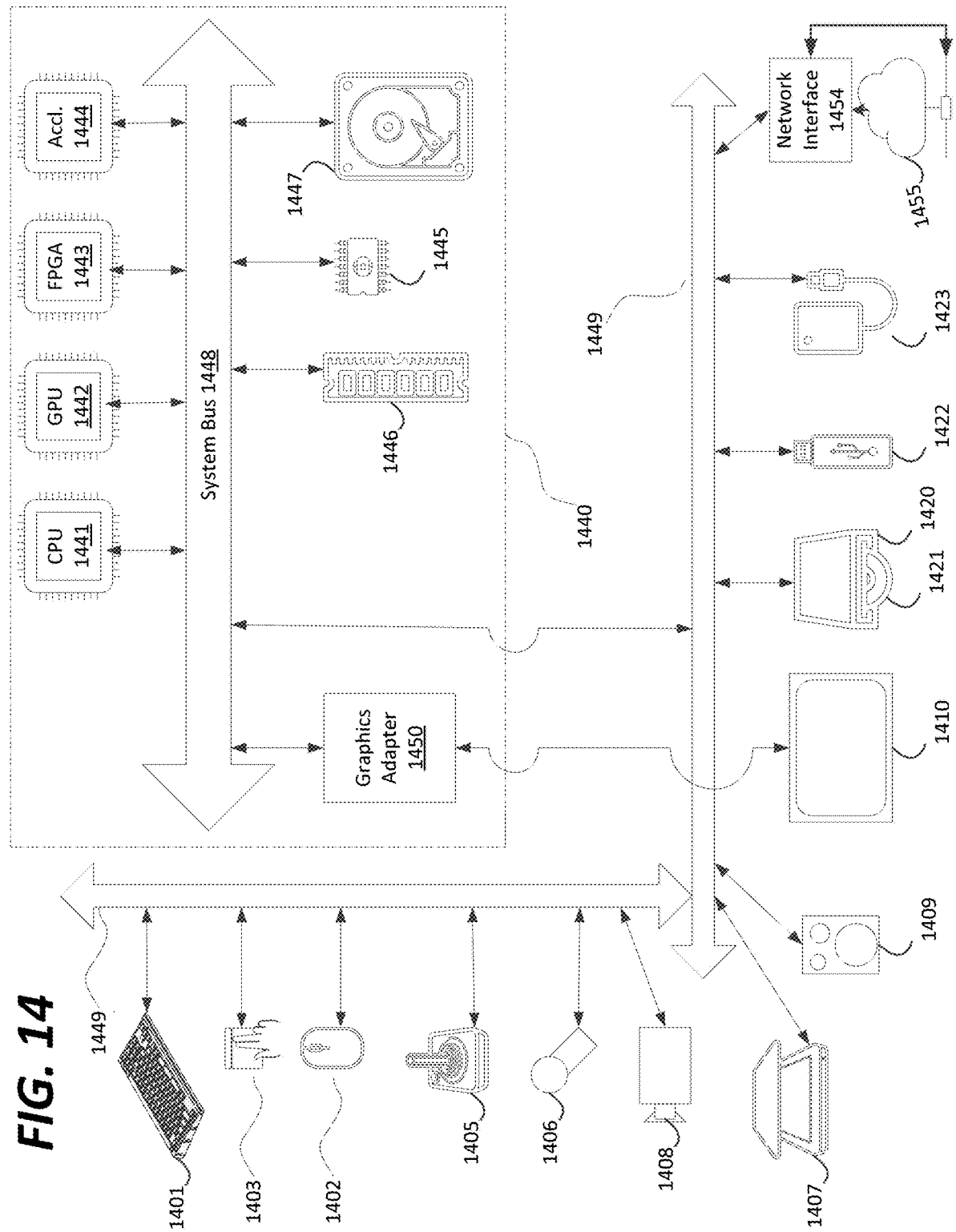
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a video decoder, the method including receiving a coded video bitstream; obtaining, for a current block from the coded video bitstream, one or more initial motion vectors; determining whether a decoder side motion vector refinement process is enabled; in response to determining that the decoder side motion vector refinement process is enabled, determining whether the one or more initial motion vectors are included in a latency region that indicates a region of one or more blocks having unrefined motion vectors; and in response to determining that the one or more initial motion vectors are not included in the latency region, performing the motion vector refinement process using the one or more initial motion vectors to generate a plurality of refined motion vectors.

(2) The method according to feature (1), in which the latency region includes at least two non-contiguous sub regions.

(3) The method according to feature (1) or (2), in which a size of the current block is $2^M \times 2^N$, and each refined motion vector from the plurality of refined motion vectors is generated for a corresponding $2^{(M-X)} \times 2^{(N-X)}$ sub-block of the current block, in which M, N, and X are positive integers, and X is less than M and N.

(4) The method according to feature (3), further including selecting a refined motion vector from the plurality of refined motion vectors; and performing inter prediction of the current block using the selected refined motion vector to decode the current block.

(5) The method of feature (4), in which the selected refined motion vector is associated with a top left $2^{(M-X)} \times 2^{(N-X)}$ sub-block of the $2^M \times 2^N$ current block.

(6) The method of feature (4), in which the selected refined motion vector is associated with a center $2^{(M-X)} \times 2^{(N-X)}$ sub-block of the $2^M \times 2^N$ current block.

(7) The method of feature (6), in which the center $2^{(M-X)} \times 2^{(N-X)}$ sub-block is one of (i) a bottom right $2^{(M-X)} \times 2^{(N-X)}$ sub-block of a top left $2^{(M-1)} \times 2^{(N-1)}$ sub-block, (ii) a top-right right $2^{(M-X)} \times 2^{(N-X)}$ sub-block of a top right $2^{(M-1)} \times 2^{(N-1)}$ sub-block, (iii) a top right $2^{(M-X)} \times 2^{(N-X)}$ sub-block of a bottom left $2^{(M-1)} \times 2^{(N-1)}$ sub-block, and (iv) a top left $2^{(M-X)} \times 2^{(N-X)}$ sub-block of a bottom right $2^{(M-1)} \times 2^{(N-1)}$ sub-block.

(8) The method of any one of features (4)-(7), in which in response to a determination that a $2^{(M-X)} \times 2^{(N-X)}$ sub-block is coded in an intra mode, the refined motion vector of the intra coded $2^{(M-X)} \times 2^{(N-X)}$ sub-block is one of (i) unavailable for selection for the inter prediction of the current block and (ii) set to zero.

(9) The method of any one of features (4)-(8), further including in response to a determination that the one or more initial motion vectors are equal to the selected refined motion vector, filtering samples corresponding to the selected refined motion vector using an interpolation filter that is used when the motion vector refinement process is not enabled.

(10) The method of any one of features (4)-(9), further including determining a boundary strength based on (i) a first previously decoded block (P block) that is one of to the left and above the decoded current block and (ii) a second previously decoded block (Q block) that is one of to the right and above the decoded current block; and in response to a determination that the boundary strength is not zero, performing deblocking of the current block using a deblocking filter having a filter strength corresponding to the determined boundary strength.

(11) The method of feature (10), in which the boundary strength is determined not to be zero in response to a determination that:

$|MV\_P_h - MV\_Q_h| >= A*SR + B$, or $|MV\_P_v - MV\_Q_v| >= A*SR + B$, where $MV\_P_h$ is a motion vector of the P block that is above the current block, $MV\_Q_h$ is a motion vector of the Q block that is above the current block, $MV\_P_v$ is a motion vector of the P block that is to the left of the current block, $MV\_Q_v$ is a motion vector of the Q block that is to the right of the current block, A and B are integers, and SR is a search range for the motion vector refinement process.

(12) The method of feature (10), in which the boundary strength is determined not to be zero in response to a determination that the motion vector refinement process is enabled for the current block.

(13) A video decoder for video decoding, the video decoder including processing circuitry configured to receive a coded video bitstream, obtain, for a current block from the coded video bitstream, one or more initial motion vectors, determine whether a decoder side motion vector refinement process is enabled, in response to the determination that the decoder side motion vector refinement process is enabled, determine whether the one or more initial motion vectors are included in a latency region that indicates a region of one or more blocks having unrefined motion vectors, and in response to the determination that the one or more initial motion vectors are not included in the latency region, perform the motion vector refinement process using the one or more initial motion vectors to generate a plurality of refined motion vectors.

(14) The video decoder according to feature (13), in which the latency region includes at least two non-contiguous sub regions.

(15) The video decoder according to feature (13) or (14), in which a size of the current block is $2^M \times 2^N$, and each refined motion vector from the plurality of refined motion vectors is generated for a corresponding $2^{(M-X)} \times 2^{(N-X)}$ sub-block of the current block, in which M, N, and X are positive integers, and X is less than M and N.

(16) The video decoder according to feature (15), in which the processing circuitry is further configured to select a refined motion vector from the plurality of refined motion vectors, and perform inter prediction of the current block using the selected refined motion vector to decode the current block.

(17) The video decoder of feature (16), in which the processing circuitry is further configured to in response to a determination that the one or more initial motion vectors are equal to the selected refined motion vector, filter samples corresponding to the selected refined motion vector using an interpolation filter that is used when the motion vector refinement process is not enabled.

(18) The video decoder of feature (16), in which the processing circuitry is further configured to determine a boundary strength based on (i) a first previously decoded block (P block) that is one of to the left and above the decoded current block and (ii) a second previously decoded block (Q block) that is one of to the right and above the decoded current block, and in response to a determination that the boundary strength is not zero, perform deblocking of the current block using a deblocking filter having a filter strength corresponding to the determined boundary strength.

(19) The video decoder of feature (18), in which the boundary strength is determined not to be zero in response to a determination that:

$|MV\_P_h - MV\_Q_h| >= A*SR + B$, or $|MV\_P_v - MV\_Q_v| >= A*SR + B$, where $MV\_P_h$ is a motion vector of the P block that is above the current block, $MV\_Q_h$ is a motion vector of the Q block that is above the current block, $MV\_P_v$ is a motion vector of the P block that is to the left of the current block, $MV\_Q_v$ is a motion vector of the Q block that is to the right of the current block, A and B are integers, and SR is a search range for the motion vector refinement process.

(20) A non-transitory computer readable medium having instructions stored therein, which when executed by a processor in a video decoder causes the processor to execute a method including receiving a coded video bitstream; obtaining, for a current block from the coded video bitstream, one or more initial motion vectors; determining whether a decoder side motion vector refinement process is enabled; in response to determining that the decoder side motion vector refinement process is enabled, determining whether the one or more initial motion vectors are included in a latency region that indicates a region of one or more blocks having unrefined motion vectors; and in response to determining that the one or more initial motion vectors are not included in the latency region, performing the motion vector refinement process using the one or more initial motion vectors to generate a plurality of refined motion vectors.

What is claimed is:

1. A method of video decoding for a video decoder, the method comprising:
   receiving a coded video bitstream;
   obtaining, for a current block from the coded video bitstream, one or more initial motion vectors;
   determining whether a decoder side motion vector refinement process is enabled;
   in response to determining that the decoder side motion vector refinement process is enabled, determining whether the one or more initial motion vectors are included in a latency region that indicates a region of one or more blocks having unrefined motion vectors; and in response to determining that the one or more initial motion vectors are not included in the latency region, performing the motion vector refinement process using the one or more initial motion vectors to generate a plurality of refined motion vectors.

2. The method according to claim 1, wherein the latency region includes at least two non-contiguous sub regions.

3. The method according to claim 1, wherein a size of the current block is $2^M \times 2^N$, and each refined motion vector from the plurality of refined motion vectors is generated for a corresponding $2^{(M-X)} \times 2^{(N-X)}$ sub-block of the current block, wherein M, N, and X are positive integers, and X is less than M and N.

4. The method according to claim 3, further comprising:
selecting a refined motion vector from the plurality of refined motion vectors; and
performing inter prediction of the current block using the selected refined motion vector to decode the current block.

5. The method of claim 4, wherein the selected refined motion vector is associated with a top left $2^{(M-X)} \times 2^{(N-X)}$ sub-block of the $2^M \times 2^N$ current block.

6. The method of claim 4, wherein the selected refined motion vector is associated with a center $2^{(M-X)} \times 2^{(N-X)}$ sub-block of the $2^M \times 2^N$ current block.

7. The method of claim 6, wherein the center $2^{(M-X)} \times 2^{(N-X)}$ sub-block is one of (i) a bottom right $2^{(M-X)} \times 2^{(N-X)}$ sub-block of a top left $2^{(M-1)} \times 2^{(N-1)}$ sub-block, (ii) a top-right right $2^{(M-X)} \times 2^{(N-X)}$ sub-block of a top right $2^{(M-1)} \times 2^{(N-1)}$ sub-block, (iii) a top right $2^{(M-X)} \times 2^{(N-X)}$ sub-block of a bottom left $2^{(M-1)} \times 2^{(N-1)}$ sub-block, and (iv) a top left $2^{(M-X)} \times 2^{(N-X)}$ sub-block of a bottom right $2^{(M-1)} \times 2^{(N-1)}$ sub-block.

8. The method of claim 4, wherein in response to a determination that a $2^{(M-X)} \times 2^{(N-X)}$ sub-block is coded in an intra mode, the refined motion vector of the intra coded $2^{(M-X)} \times 2^{(N-X)}$ sub-block is one of (i) unavailable for selection for the inter prediction of the current block and (ii) set to zero.

9. The method of claim 4, further comprising:
in response to a determination that the one or more initial motion vectors are equal to the selected refined motion vector, filtering samples corresponding to the selected refined motion vector using an interpolation filter that is used when the motion vector refinement process is not enabled.

10. The method of claim 4, further comprising:
determining a boundary strength based on (i) a first previously decoded block (P block) that is one of to the left and above the decoded current block and (ii) a second previously decoded block (Q block) that is one of to the right and above the decoded current block; and
in response to a determination that the boundary strength is not zero, performing deblocking of the current block using a deblocking filter having a filter strength corresponding to the determined boundary strength.

11. The method of claim 10, wherein the boundary strength is determined not to be zero in response to a determination that:

$|MV\_P_h - MV\_Q_h| >= A*SR + B$, or $|MV\_P_v - MV\_Q_v| >= A*SR + B$, where $MV\_P_h$ is a motion vector of the P block that is above the current block, $MV\_Q_h$ is a motion vector of the Q block that is above the current block, $MV\_P_v$ is a motion vector of the P block that is to the left of the current block, $MV\_Q_v$ is a motion vector of the Q block that is to the right of the current block, A and B are integers, and SR is a search range for the motion vector refinement process.

12. The method of claim 10, wherein the boundary strength is determined not to be zero in response to a determination that the motion vector refinement process is enabled for the current block.

13. A video decoder for video decoding, the video decoder comprising:
processing circuitry configured to:
receive a coded video bitstream,
obtain, for a current block from the coded video bitstream, one or more initial motion vectors,
determine whether a decoder side motion vector refinement process is enabled,
in response to the determination that the decoder side motion vector refinement process is enabled, determine whether the one or more initial motion vectors are included in a latency region that indicates a region of one or more blocks having unrefined motion vectors, and
in response to the determination that the one or more initial motion vectors are not included in the latency region, perform the motion vector refinement process using the one or more initial motion vectors to generate a plurality of refined motion vectors.

14. The video decoder according to claim 13, wherein the latency region includes at least two non-contiguous sub regions.

15. The video decoder according to claim 13, wherein a size of the current block is $2^M \times 2^N$, and each refined motion vector from the plurality of refined motion vectors is generated for a corresponding $2^{(M-X)} \times 2^{(N-X)}$ sub-block of the current block, wherein M, N, and X are positive integers, and X is less than M and N.

16. The video decoder according to claim 15, wherein the processing circuitry is further configured to:
select a refined motion vector from the plurality of refined motion vectors, and
perform inter prediction of the current block using the selected refined motion vector to decode the current block.

17. The video decoder of claim 16, wherein the processing circuitry is further configured to:
in response to a determination that the one or more initial motion vectors are equal to the selected refined motion vector, filter samples corresponding to the selected refined motion vector using an interpolation filter that is used when the motion vector refinement process is not enabled.

18. The video decoder of claim 16, wherein the processing circuitry is further configured to:
determine a boundary strength based on (i) a first previously decoded block (P block) that is one of to the left and above the decoded current block and (ii) a second previously decoded block (Q block) that is one of to the right and above the decoded current block, and
in response to a determination that the boundary strength is not zero, perform deblocking of the current block using a deblocking filter having a filter strength corresponding to the determined boundary strength.

19. The video decoder of claim 18, wherein the boundary strength is determined not to be zero in response to a determination that:

$|MV\_P_h - MV\_Q_h| >= A*SR+B$, or $|MV\_P_v - MV\_Q_v| >= A*SR+B$, where $MV\_P_h$ is a motion vector of the P block that is above the current block, $MV\_Q_h$ is a motion vector of the Q block that is above the current block, $MV\_P_v$ is a motion vector of the P block that is to the left of the current block, $MV\_Q_v$ is a motion vector of the Q block that is to the right of the current block, A and B are integers, and SR is a search range for the motion vector refinement process.

20. A non-transitory computer readable medium having instructions stored therein, which when executed by a processor in a video decoder causes the processor to execute a method comprising:

receiving a coded video bitstream;

obtaining, for a current block from the coded video bitstream, one or more initial motion vectors;

determining whether a decoder side motion vector refinement process is enabled;

in response to determining that the decoder side motion vector refinement process is enabled, determining whether the one or more initial motion vectors are included in a latency region that indicates a region of one or more blocks having unrefined motion vectors; and in response to determining that the one or more initial motion vectors are not included in the latency region, performing the motion vector refinement process using the one or more initial motion vectors to generate a plurality of refined motion vectors.

* * * * *